(12) United States Patent
Shimizu et al.

(10) Patent No.: US 7,858,239 B2
(45) Date of Patent: Dec. 28, 2010

(54) NEGATIVE ELECTRODE MATERIAL FOR NON-AQUEOUS ELECTROLYTE SECONDARY BATTERY, PROCESS FOR PRODUCING THE SAME, NEGATIVE ELECTRODE, AND NON-AQUEOUS ELECTROLYTE SECONDARY BATTERY

(75) Inventors: Kazuhiko Shimizu, Iwaki (JP); Aisaku Nagai, Tokyo (JP)

(73) Assignee: Kureha Corporation, Tokyo (JP)

(*) Notice: Subject to any disclaimer, the term of this patent is extended or adjusted under 35 U.S.C. 154(b) by 194 days.

(21) Appl. No.: 11/991,628

(22) PCT Filed: Sep. 5, 2006

(86) PCT No.: PCT/JP2006/317496

§ 371 (c)(1),
(2), (4) Date: Mar. 7, 2008

(87) PCT Pub. No.: WO2007/040007

PCT Pub. Date: Apr. 12, 2007

(65) Prior Publication Data

US 2009/0297953 A1 Dec. 3, 2009

(30) Foreign Application Priority Data

Sep. 9, 2005 (JP) .............................. 2005-261845

(51) Int. Cl.
*H01M 4/58* (2010.01)
*C01B 31/02* (2006.01)

(52) U.S. Cl. ............................. 429/231.8; 423/445 R

(58) Field of Classification Search ............ 429/231.95, 429/218, 217, 232, 194; 252/500, 521.5; 264/53; 423/209

See application file for complete search history.

(56) References Cited

U.S. PATENT DOCUMENTS 4,276,246 A * 6/1981 Bonzom et al. ............... 264/53

| | | | |
|---|---|---|---|
| 4,959,281 A | 9/1990 | Nishi et al. | |
| 5,312,611 A | 5/1994 | Takami et al. | |
| 5,527,643 A * | 6/1996 | Sonobe et al. | 429/231.8 |
| 6,103,426 A * | 8/2000 | Narang et al. | 429/324 |
| 6,482,547 B1 | 11/2002 | Yoon et al. | |
| 2002/0061445 A1 * | 5/2002 | Kitagawa et al. | 429/231.8 |

FOREIGN PATENT DOCUMENTS

| JP | 4-319265 | 11/1992 |
|---|---|---|
| JP | 5-89879 | 4/1993 |
| JP | 10-3948 | 1/1998 |
| JP | 11-354122 | 12/1999 |
| JP | 2005-200276 | 7/2005 |

OTHER PUBLICATIONS

International Search Report issued Dec. 12, 2006 in the International (PCT) Application PCT/JP2006/317496 of which the present application is the U.S. National Stage.

* cited by examiner

*Primary Examiner*—Jonathan Crepeau
*Assistant Examiner*—Kenneth Douyette
(74) *Attorney, Agent, or Firm*—Wenderoth, Lind & Ponack, L.L.P.

(57) ABSTRACT

A negative electrode material for non-aqueous electrolyte secondary batteries, which is best suited for large current I/O non-aqueous electrolyte secondary batteries represented by those for hybrid electric vehicles (HEVs), which are unlikely to be influenced by the deterioration of battery characteristics due to water, and a production process thereof are provided.

The negative electrode material having at least one exothermic peak in the range of not lower than 650° C. and lower than 700° C., and at least one exothermic peak in the range of not lower than 700° C. and lower than 760° C., in differential thermal analysis measured under an air flow. The production process of the negative electrode material for non-aqueous electrolyte secondary batteries is characterized by carbonizing a negative electrode material precursor having an oxygen content of not less than 5% by weight and less than 10% by weight, under an inert gas flow at a rate of not more than 120 ml/g·h, under a pressure of normal pressure to 10 kPa, at a temperature higher than 1100° C. and lower than 1500° C.

12 Claims, 10 Drawing Sheets

NEGATIVE ELECTRODE MATERIAL FOR NON-AQUEOUS ELECTROLYTE SECONDARY BATTERY, PROCESS FOR PRODUCING THE SAME, NEGATIVE ELECTRODE, AND NON-AQUEOUS ELECTROLYTE SECONDARY BATTERY

TECHNICAL FIELD

The present invention relates to a non-aqueous electrolyte secondary battery, specifically, a negative electrode material for a non-aqueous electrolyte secondary battery having a high input density and output density; a process of producing the negative electrode material; as well as a non-aqueous electrolyte secondary battery using the negative electrode material, specifically a non-aqueous electrolyte secondary battery for hybrid electric vehicles.

BACKGROUND ART

As a secondary battery having high energy density, a non-aqueous electrolyte lithium secondary battery using a carbonaceous material as a negative electrode has been proposed (see, for example, Patent Literature 1 to 4). This utilizes the fact that a lithium-intercalated carbon can be easily formed electrochemically. By charging this battery, the lithium in a positive electrode made of a chalcogen compound such as $LiCoO_2$ is electrochemically doped in between layers of negative electrode carbon. The lithium-doped carbon acts as a lithium electrode, and by discharging, the lithium is de-doped from between the carbon layers and is returned into a positive electrode. Since such a non-aqueous electrolyte secondary battery is small and light, and has a high energy density, demand for the battery to be used as a power source of mobile devices is expanding in recent years.

As a negative electrode material for such non-aqueous electrolyte secondary batteries used in small mobile devices, non-graphitizable carbon (also called "hard carbon") having a discharge capacity of much more than 372 mAh/g carbon, which is the theoretical value of graphite, has been widely used. To increase the capacity, for example, a method, comprising calcinating the non-graphitizable carbon under a condition of flow of inert gas (Patent Literature 5) or under reduced pressure (Patent Literature 6) to remove gas generated in the carbonizing reaction, thereby enhancing development of pores (open pores), has been employed.

However, there was a problem in relation to the above method in that, when the thus formed non-graphitizable carbon is left to stand in the air, an oxidation reaction occurs, resulting in increase in an irreversible capacity or deterioration of cycle performances. As a solution for the problem, a method comprising storing the non-graphitizable carbon in an inert gas atmosphere (Patent Literature 7) has been proposed.

As another method for reducing deterioration of the characteristics, a method comprising depositing a thermally decomposed carbon on a carbon surface to adjust the pore size has been proposed (Patent Literature 8). However, in order to increase a discharge capacity, a large number of open pores are desired.

As a novel use exploiting the small and light character of the non-aqueous electrolyte secondary battery, those used for electric vehicles (EVs) driven by a motor alone and for hybrid electric vehicles (HEVS) combining an internal-combustion engine and a motor has been studied intensively. Among others, HEVs combining an engine and a battery-driven motor are now drawing much attention as cars achieving both economic efficiency and low fuel consumption. Especially, as for HEVs, since the start of their commercial sale in 1997, their environment-friendly concept has been accepted, and their market has been growing year by year. In these cars, since the weight saving, the input density and output density of the battery effect an improvement in fuel consumption, improvements in the characteristics of the battery to be mounted on the cars has been demanded. Some of the non-aqueous electrolyte secondary batteries are already in use for cars.

When HEVs run at a low speed or under a driving mode of low load, a load to a motor having a higher efficiency than an internal combustion engine is increased, and when the HEVs run under a driving mode at a high speed or under a high load, such as the occasion making a quick start or passing at a high speed, the load to the engine having a higher efficiency than the motor is increased. Further, when the cars brake, the motor is used as a generator, and a regenerated electric current is stored in a battery. Thus, the motor is mainly used for start, acceleration and slowdown of HEVs. It is demanded that a battery which supplies electric power to the motor does not have a high energy density to supply small electric power for a long period of time as demanded for a small mobile device, but a high input and output characteristics for supplying and receiving a large electric power in a short time.

Thus, the characteristics demanded for secondary batteries of HEVs, are different from those demanded for secondary batteries of a small mobile device. Most of the studies on negative electrode materials for non-aqueous electrolyte secondary batteries has been directed to making improvements in the characteristics of negative electrode materials of secondary batteries used as an electric source for small mobile devices. However, a negative electrode material having the necessary characteristics for a large current input/output non-aqueous electrolyte secondary batteries such as secondary batteries for HEVs has not been studied.

As a negative electrode material for non-aqueous electrolyte secondary battery having a high durability when used for a long time, and which is capable of high current input/output, a non-graphitizable carbon material whose average interlayer spacing d $002$ is larger than that of graphite, and which has a character that an electric potential changes depending on an amount of doped lithium, is suitable, and various materials have been proposed (Patent Literature 9).

These materials have micropores. Since moisture is adsorbed in the micropores, there are problems in that an irreversible capacity is increased in initial charging, and a capacity of the battery is decreased with progress of a charge-discharge cycle. To address this problem, a method, wherein the carbon material which is once calcinated is subjected to heat treatment again so as to eliminate the adsorbed moisture, has been proposed (Patent Literature 10). However, since the moisture-adsorbing property itself of the material is not improved, there are problems in that care should be taken for the moisture absorption of the material during storage and production; and control of atmosphere is required.

To reduce molecular adsorption of a material, a material in which a thermally decomposed carbon layer is formed on the surface of the carbon particles by a chemical deposition treatment, has been proposed (Patent Literature 11). However, in large scale production, since the thermally decomposed carbon serves as a binder of carbon particles, there is a problem with regard to the production process in that the material coagulates in a reaction bath, or it is difficult to uniformly form the thermally decomposed carbon layer on a large number of particles. There is also a problem in that increase of cost for production cannot be avoided because of addition of a production step.

Patent Literature 1: JP 57-208079 A
Patent Literature 2: JP 62-90863 A
Patent Literature 3: JP 62-122066 A
Patent Literature 4: JP 2-66856 A
Patent Literature 5: JP 3399015 B
Patent Literature 6: JP 3427577 B
Patent Literature 7: JP 8-298111 A
Patent Literature 8: JP 2003-3238911 A
Patent Literature 9: PCT/JP2005/005908
Patent Literature 10: JP 3619799 B
Patent Literature 11: JP 9-326254 A
Patent Literature 12: JP 3496901 B
Patent Literature 13: JP 7-122300 A

DISCLOSURE OF THE INVENTION

Problems to be Solved by the Invention

A primary object of the present invention is to provide a negative electrode material for non-aqueous electrolyte secondary batteries, which material is best suited for large current input/output of non-aqueous electrolyte secondary batteries such as non-aqueous electrolyte secondary batteries for hybrid electric vehicles (HEVs), and which is unlikely to cause deterioration of battery characteristics due to moisture. A further object of the present invention is to provide a process for producing the material.

Another object of the present invention is to provide a non-aqueous electrolyte secondary battery comprising a negative electrode material which is used for non-aqueous electrolyte secondary batteries and which is unlikely to be influenced by moisture; as well as a non-aqueous electrolyte secondary battery for hybrid electric vehicles (HEVs).

Means for Solving the Problems

The charge-discharge curve of a non-aqueous electrolyte secondary battery, shown in FIG. 1, shifts to a direction of higher electric potential with respect to an open circuit voltage during charging, and shifts to a direction of lower electric potential with respect to an open circuit voltage during discharging. This potential difference is expressed by $\Delta V$ (=I (current)×R (internal resistance of battery)). When the internal resistance is constant, the larger $\Delta V$ indicates that the battery can be used under a larger electric current. The absolute value of $\Delta V$ is expressed as a difference between the upper limit electric potential and the open circuit voltage during charging, and is expressed as a difference between the lower limit electric potential and the open terminal voltage during discharging.

The various negative electrode materials for non-aqueous electrolyte secondary batteries so far proposed have been developed mainly for small mobile devices such as mobile phones and mobile personal computers. For a non-aqueous electrolyte secondary battery used in mobile devices, it is demanded that the battery discharge a small electric current from a fully charged state to the lower limit electric potential (complete discharging), and to repeat the cycle of being charged to a fully charged state and subsequent discharging. Therefore, it is demanded that the battery discharge an electric current keeping an electric potential as high as possible, and attain a change in electric potential ($\Delta V$) as small as possible with respect to a change in a discharge capacity.

A charge-discharge curve of a non-aqueous electrolyte secondary battery for small mobile devices, which has been used, is shown as curve (1) in FIG. 1. The curve (1) is a charge-discharge curve of a non-aqueous electrolyte secondary battery for small mobile devices, which battery employs $LiCoO_2$ as a positive electrode as an active material whose change in electric potential (E) is small with respect to change in a discharge capacity (mAh), and employs graphite as a negative electrode. As seen from the curve (1), the upper limit of an electric potential is 4.1V, the lower limit of an electric potential is 3.0V, the battery voltage at the discharge ratio of 50% is 3.8V, and the battery voltage (V) is kept at a high level of not lower than 3.6 V until the discharge ratio is close to 100% of the battery voltage of 4.1V at the fully charged state. In this case, the potential difference $\Delta V$ during charging is 0.3V (4.1-3.8), and the potential difference $\Delta V$ during discharging is 0.8V (3.8-3.0).

On the other hand, curve (2) in FIG. 1 is a charge-discharge curve of a large current input/output non-aqueous electrolyte secondary battery employing $LiMn_2O_4$ as a positive electrode, and a hard carbon (non-graphitizable carbon) of the present invention as a negative electrode. As seen from the curve (2), the upper limit electric potential is 4.2V, the lower limit electric potential is 2.5V, the battery voltage at the discharge ratio of 50% is 3.7V, and the electric potential is decreased at almost a constant rate from the battery voltage of 4.2V at a fully charged state to that of 2.5 V at the discharge ratio of 100%. In this case, the potential difference $\Delta V$ during charging is 0.5V (4.2-3.7), and the potential difference $\Delta V$ during discharging is 1.2V (3.7-2.5). Thus, a charge-discharge behavior suitable for large current input/output, which behavior is largely different from that suitable for small current input/output for non-aqueous electrolyte secondary batteries used in small mobile devices, is observed.

The non-aqueous electrolyte secondary battery suited for high current input/output having the curve (2) is preferably used in the condition that the input and output characteristics are well balanced, that is, the charging and discharging are repeated in the charging region at about 50% when the fully charged state is taken as 100%, and is not preferably used in the condition that full charging and complete discharging are repeated. In such an embodiment, it is preferred to use a material whose electric potential (E) largely changes at a constant slope with respect to the discharge capacity (mAh), as a negative electrode material; not a material having a large discharge capacity (mAh/g) per unit weight of the active material, as demanded for the negative electrode material used in small mobile devices. Specifically, non-graphitizable carbon and easily-graphitizable carbon which are active materials having a large change in electric potential (E) with respect to the discharge capacity (mAh) can preferably be used. Non-graphitizable carbon is preferred in view of durability. Since non-graphitizable carbon has excellent input/output characteristics as a negative electrode material for high current input/output non-aqueous electrolyte secondary batteries, as well as high durability at a high temperature and high price competitiveness, it is appropriate as a negative electrode material for large current input/output non-aqueous electrolyte secondary batteries.

However, since the non-graphitizable carbon as a negative electrode material has been studied as a negative electrode material for small mobile devices, it has been studied to have a large discharge capacity, a small potential difference, and a large gas adsorption. A non-graphitizable carbon having many open pores has been proposed as a negative electrode material (Patent Literatures 5, 12 and 13). Such a non-graphitizable carbon having a number of open pores cannot show a charge-discharge behavior demanded for a negative electrode material of large current input/output non-aqueous electrolyte secondary batteries, which is shown as the curve (2) in FIG. 1. Moreover, since many open pores exist, there is a problem in that, due to high water adsorption, characteristics of the non-aqueous electrolyte secondary battery deteriorate.

As a result of intensive study for solving the problem, the present inventors discovered that water adsorption can be decreased by employing a negative electrode material having a number of closed pores. The present inventors also discovered that a negative electrode material having a number of closed pores can be produced by carbonizing a negative electrode material precursor having low oxygen content under a low inert gas flow under normal pressure or under slightly increased pressure.

That is, the present invention provides a negative electrode material for non-aqueous electrolyte secondary batteries, which the negative electrode material has at least one exothermic peak in the range of not lower than 650° C. and lower than 700° C., and at least one exothermic peak in the range of not lower than 700° C. and lower than 760° C., in differential thermal analysis measured under an air flow. The negative electrode material for non-aqueous electrolyte secondary batteries, according to the present invention, preferably has at least one exothermic peak in the range of not lower than 654° C. and lower than 690° C., and at least one exothermic peak in the range of not lower than 700° C. and lower than 758° C., more preferably has at least one exothermic peak in the range of not lower than 660° C. and lower than 690° C., and at least one exothermic peak in the range of not lower than 704° C. and lower than 758° C.

In general, the exothermic peaks measured by differential thermal analysis tend to shift to the side of high temperature as the crystallization proceeds. With the conventional non-graphitizable carbon as the negative electrode material used in small mobile devices, there is a tendency that the exothermic peaks in differential thermal analysis do not emerge in the region of not lower than 700° C. On the other hand, in the differential thermal analysis of graphite, exothermic peaks emerge in the region higher than 750° C. For example, the present inventors have confirmed that, in case of natural graphite, an exothermic peak emerges at 755.8° C., and, in case of artificial graphite, an exothermic peak emerges at 875° C. (see FIG. 4). Therefore, the negative electrode material for non-aqueous electrolyte secondary batteries according to the present invention is thought to have a portion in which the crystallization is proceeded and a portion in which the crystallization has not proceeded, and it is thought that, in the deep portion of a negative electrode material according to the present invention, pores are developed, and that, in the surface, micro pores are closed to form closed pores.

The negative electrode material for non-aqueous electrolyte secondary batteries according to the present invention has an average interlayer spacing $d_{002}$ determined by X-ray diffraction method of not less than 0.355 nm and not more than 0.400 nm, preferably not less than 0.360 nm and not more than 0.375 nm, more preferably not less than 0.365 nm and not more than 0.370 nm. If the average interlayer spacing is within this range, deterioration of the electrode due to expansion/shrinkage of the negative electrode material (carbonaceous material) caused by the repetition of charging and discharging, decrease in cycle durability at high temperature, and increase in the irreversible capacity of the active material defined as a difference between the doping capacity and dedoping capacity of the active material (e.g., lithium) constituting the positive electrode, can be prevented.

The negative electrode material for non-aqueous electrolyte secondary batteries according to the present invention preferably satisfies at least one of the following conditions (1) and (2):

(1) The true density ($\rho_H$) measured according to the gas displacement method defined in JIS R1620(4) using helium as a displacement medium is not less than 1.5 g/cm³ and not more than 1.9 g/cm³, preferably not less than 1.55 g/cm³ and not more than 1.85 g/cm³, more preferably not less than 1.60 g/cm³ and not more than 1.80 g/cm³;

(2) The equilibrium water adsorption at 120 hours later, measured according to JIS K1469, is not more than 1% by weight, preferably not less than 0.0% by weight and not more than 0.5% by weight.

Further, (3) the specific surface area measured by BET method is not less than 0.5 m²/g and not more than 5 m²/g, preferably not less than 0.8 m²/g and not more than 4 m²/g, still more preferably not less than 1.0 m²/g and not more than 3.5 m²/g, most preferably not less than 1.3 m²/g and not more than 2.5 m²/g.

(1) The true density ($\rho_H$) measured using helium as a displacement medium is an index of diffusibility of helium gas. The fact that this value is large and close to 2.0 g/cm³ means that the diffusibility of helium is very high. The fact that the diffusibility of helium is high means that many open pores exist. On the other hand, since helium has the smallest atomic diameter (0.26 nm), the micro pores smaller than the atomic diameter of helium can be considered as closed pores. Thus, the fact that the diffusibility of helium gas is small means that many closed pores exist. Therefore, the true density measured using helium gas as a displacement medium is not only an index of diffusibility of helium gas, but also an index of closed pores contained in the negative electrode material according to the present invention.

(2) If the equilibrium of water adsorption is within the range described above, the non-aqueous electrolyte secondary batteries according to the present invention has a low water adsorption, and deterioration of the battery performances can be prevented. The water adsorption shows good correlation with diffusibility of helium gas and the smaller the diffusibility of helium of the negative electrode material, the smaller the water adsorption.

(3) The smaller specific surface area indicates the smaller outer surface area giving the sites to which water is adsorbed, and simultaneously, it means that the edge sites in which the active material (e.g. lithium) of the positive electrode that can be doped enters are smaller, leading to deterioration of characteristics of the negative electrode. Therefore, considering the balance between the water adsorption and the doping amount of the active material, the specific surface area is preferably within the range described above.

The negative electrode material for non-aqueous electrolyte secondary batteries according to the present invention preferably has a discharge capacity of not less than 60 mAh/g and less than 115 mAh/g per 1 g at an electric potential of 0.1V; has a discharge capacity of not less than 200 mAh/g and less than 300 mAh/g per 1 g at an electric potential of 1.5V in counter electrode lithium evaluation; and has a difference between the capacity required for lithium doping and the capacity required for lithium dedoping (irreversible capacity) not more than 60 mAh/g. Especially, the negative electrode material for non-aqueous electrolyte secondary batteries according to the present invention preferably has a difference between the capacity required for lithium doping and the capacity required for lithium dedoping (irreversible capacity) at a current density of 0.5 mA/cm² of not less than 25 mAh/g and not more than 60 mAh/g, more preferably, not less than 29 mAh/g and not more than 55 mAh/g. The irreversible capacity is defined as a difference between the charge capacity and discharge capacity, and the smaller the irreversible capacity, the higher the durability to repetition of charging and discharging. The discharge efficiency (%) (the percentage obtained by dividing the discharge capacity by the charge capacity) of the negative electrode material for non-aqueous electrolyte secondary batteries according to the present invention is preferably not less than 86%, more preferably not less than 88%.

As mentioned above, the negative electrode material for non-aqueous electrolyte secondary batteries according to the present invention shows the charge-discharge behavior as shown by the curve (2) in FIG. 1, demanded for the negative electrode material for high current input/output non-aqueous electrolyte secondary batteries. Moreover, when compared with negative electrode materials having a small interlayer spacing, the expansion/shrinkage is smaller, so that the high temperature cycle durability is excellent. When compared with negative electrode materials having a large interlayer spacing, the irreversible capacity of the active material defined as the difference between the doping capacity and dedoping capacity of the active material (such as lithium) is smaller, so that discharge efficiency is good. Further, since closed pores are abundant and open pores are few; the water adsorption is low, which can solve the problem of deterioration of the non-aqueous electrolyte secondary battery performances.

The present invention also provides a process of producing the above-described negative electrode material for non-aqueous electrolyte secondary batteries. This process is characterized by carbonizing a carbonaceous material having an oxygen content of not less than 5% by weight and less than 10% by weight, under an inert gas flow at a rate of not more than 120 ml/g·h, under a pressure of normal pressure to 10 kPa, at a temperature higher than 1100° C. and lower than 1500° C.

In the production process according to the present invention, one of the important factors for obtaining a negative electrode material which is a non-graphitizable carbon having a small diffusibility of helium is to control the oxygen content of the carbonaceous material (negative electrode material precursor) to a prescribed range. The oxygen content in the negative electrode material precursor is not less than 5% by weight and less than 10% by weight, preferably not less than 6% by weight and less than 10% by weight, more preferably not less than 7% by weight and less than 9.5% by weight. If the oxygen content in the negative electrode material precursor is less than 5% by weight, when the carbonization of the negative electrode material precursor proceeds, the average interlayer spacing becomes small, development of carbon hexagonal net plane layers is likely to occur, an easily-graphitizable carbon whose butanol true density is not less than 1.70 g/cm$^3$ is resulted; and a negative electrode material having an average interlayer spacing $d_{002}$ determined by X-ray diffraction method of not less than 0.355 nm and not more than 0.400 nm cannot be obtained. If the oxygen content in the negative electrode material precursor is not less than 10% by weight, a negative electrode material having a helium true density of more than 1.9 g/cm$^3$ and having a large diffusibility of helium is resulted, leading to high water adsorption. In the range of oxygen content of not less than 5% by weight and less than 7% by weight, there is a problem on production in that a large amount of tar components is generated in the carbonization reaction, and, if the temperature is quickly elevated, particles are foamed or the tar serves as a binder so that the particles are likely to be fused. Therefore, in cases where a negative electrode material precursor whose oxygen content is not less than 5% by weight and less than 7% by weight is used, a rate of elevating temperature during carbonization reaction is preferably made low. For example, the rate of elevating temperature is not less than 5° C./h and not more than 300° C./h, preferably not less than 10° C./h and not more than 100° C./h, still more preferably not less than 20° C./h and not more than 70° C./h.

The relationship between the oxygen content and the diffusibility of helium is thought to be as follows. By air-oxidizing petroleum or coal pitch which is a negative electrode material precursor to introduce oxygen-containing functional groups, a (non-meltable) negative electrode material precursor which is not melted by heating is obtained. Analysis of the gas generated during the carbonization reaction has revealed that the introduced oxygen-containing functional groups are eliminated to the outside of the system as carbon monoxide or carbon dioxide in the temperature range of not lower than 500° C. and not higher than 700° C. The oxygen-containing functional groups in the negative electrode material precursor are thought to exist in the forms of carbonyl groups, ether groups, hydroxyl groups and so on, and the negative electrode material precursor is thought to be made to a non-meltable state because these functional groups serve as crosslinking sites directly or through hydrogen bonds so as to interfere with the movements of the molecules in the petroleum or coal pitch. In the carbonaceous material in which the molecular movements are interfered by making the precursor non-meltable, development of mesophase pitch serving as a base of graphite hexagonal net plane layers is reduced, so that the precursor is made into a non-graphitizable carbon which is not graphitized even if subjected to carbonation at a temperature of not lower than 2000° C. In the pitch subjected to the treatment to make the pitch non-meltable, the carbonaceous material is solidified in the range of not lower than 500° C., and carbonization reaction occurs with the raise of treatment temperature accompanying removal of aliphatic functional groups and cyclization of carbon. It is thought that, if the oxygen content in the negative electrode material precursor is not less than 10% by weight, since the action by the oxygen-containing functional groups to interfere with the movements of the molecules in the pitch is too strong, the sites from which the oxygen-containing functional groups were removed remain as micro pores as they are, and the entrances of the pores are open (open pores), resulting in a negative electrode material having a high diffusibility of helium. On the other hand, in a material having a low oxygen content, since the average interlayer spacing between layers is smaller by weight by about 3% at the same temperature than that in the material having an oxygen content of not less than 10%, a stacking structure tends to be more easily developed. Further, since its specific surface area is small, and there is a tendency that a material has a small outer surface area, cyclic structures are likely to be easily developed during heat treatment. Further, exits of the pores generated at the sites from which the oxygen-containing functional groups were removed are closed by the cyclization reaction, so that so called closed pores are formed.

In the production process according to the present invention, one of the important factors for reducing the number of open pores existing in the surface of the negative electrode material is the atmosphere of the gas flow used in the carbonation of the negative electrode material precursor. In this process, inert gas flow rate per 1 g of the negative electrode material precursor and per 1 hour (h) is not more than 120 ml/g·h, preferably not more than 100 ml/g·h, more preferably not more than 80 ml/g·h. If the flow rate of the inert gas during carbonization is high, the low molecular gases (such as hydrogen, methane, carbon monoxide and carbon dioxide) generated from the negative electrode material precursor are quickly removed, and a negative electrode material (the conventional negative electrode material for small mobile devices) having a number of pores (open pores) whose entrances are open is likely to be formed. Such a negative electrode material has a high diffusibility of helium, and has a helium true density of more than 1.9 g/cm$^3$. On the other hand, if the carbonization reaction is carried out under an inert gas flow having a flow rate as low as possible, it is thought that since the low molecular substances once generated from the negative electrode material are thermally decomposed again at the surface of the carbon particles to form carbon coating films, closed pores are formed. Thus obtained negative electrode materials have a low diffusibility of helium and a helium true density of not more than 1.9 g/cm$^3$. Preferred examples of the inert gas which can be used in this process include nitrogen, argon and the like.

In the production process according to the present invention, another important factor for reducing the number of open pores existing in the surface of the negative electrode material is pressure used in the carbonization of the negative electrode material precursor. If the carbonization is carried out under reduced pressure, low molecular gases (hydrogen, methane, carbon dioxide and carbon monoxide) generated from the negative electrode material precursor are quickly aspirated and removed, so that a negative electrode material having pores (open pores) whose entrances are open is likely to be formed. On the other hand, it is thought that if the carbonization is carried out under normal pressure or under a pressure increased by 10 kPa, preferably under normal pressure or under a pressure increased by 3 kPa, more preferably under normal pressure or under a pressure increased by 1 kPa, neither aspiration nor removal of the gases proceeds, and formation of open pores is inhibited.

In the process according to the present invention, carbonization is carried out by calcinating the material at a temperature higher than 1100° C. and lower than 1500° C. under the above-described inert gas flow atmosphere having a low flow rate and under the above-described pressure atmosphere close to the normal pressure. If the temperature of carbonization is not higher than 1100° C., it is thought that the carbonization of the material does not develop sufficiently, so that lithium is trapped by the active sites originated from unsaturated bond-derived radicals existing in the carbon structure and so the irreversible capacity is increased. By using such a material as the negative electrode material, availability of the lithium existing in the battery is decreased, and the energy density of the overall battery is decreased, which are not preferred. On the other hand, if the temperature during the carbonization is not lower than 1500° C., although the carbonization reaction of the material is well developed, since the lithium-doping amount per a unit weight and per a unit volume is decreased, the energy density of the overall battery is decreased, so that it is not preferred. In an industrial process, calcination is preferably carried out, for example, under flow of an inert gas at the above-described low flow rate, in an inert gas fluidized bed, under the above-described pressure close to normal pressure, and in the state that the negative electrode material precursor is deposited to a thickness of not less than about 5 mm in a horizontal baking furnace. In small size productions, calcination can also be carried out in a closed system wherein a crucible containing the negative electrode material precursor is placed in an inert gas atmosphere. In this case, the thickness of the layer of the negative electrode material precursor in the crucible is preferably made as thick as possible.

In the production process according to the present invention, the negative electrode material precursor is preferably produced by a process comprising the steps of: (1) adding to a petroleum pitch or a coal pitch one or more aromatic compounds having a boiling point of not lower than 200° C. and having 2 or 3 rings, melt mixing the mixture under heat, and shaping the resulting mixture to obtain shaped pitch spheres enclosing the aromatic compound(s); (2) extracting and removing the enclosed aromatic compound(s) from the shaped pitch spheres by using a solvent in having a low solubility to the pitch and a high solubility to the aromatic compound(s), thereby obtaining porous shaped pitch spheres; and (3) oxidizing the obtained porous shaped pitch spheres.

In the step (1) of this production process, addition of the aromatic compound(s) is performed for the purpose of extracting and removing the aromatic compound(s) from the shaped pitch spheres to make the shaped spheres porous, making the crosslinking treatment by oxidation easy, and making the negative electrode material precursor obtained after carbonization porous. Preferred examples of the aromatic compounds which can be used in this production process include naphthalene, methylnaphthalene, phenylnaphthalene, benzylnaphthalene, methylanthracene, phenanthrene, biphenyl and the like, as well as mixtures of two or more of these compounds. The amount of the aromatic compound(s) to be added to the pitch is preferably not less than 30 parts by weight and not more than 70 parts by weight based on 100 parts by weight of the pitch.

The mixing of the pitch and the aromatic compound(s) is preferably carried out in a melted condition under heat in order to attain uniform mixing and to obtain shaped pitch spheres enclosing the aromatic compound(s). The shaping to the pitch spheres may be carried out in the melted state or by a method such as pulverizing a mixture of the pitch and the aromatic compound(s) after cooling. Thus formed shaped pitch spheres are preferably in the form of spherical particles having a particle size of not more than 1 mm, which makes the extraction and removal of the aromatic compound(s) in the step (2) easily be carried out.

Preferred examples of the solvent which can be used in the step (2) include aliphatic hydrocarbons such as butane, pentane, hexane and heptane; aliphatic alcohols such as methanol, ethanol, propanol and butanol; and naphtha, kerosine and the like. By treating the shaped pitch spheres with such a solvent, the enclosed aromatic compound(s) alone can be extracted and removed while retaining the sphericalness. Since pores from which the aromatic compound(s) was (were) eliminated in the form of being dissolved in the solvent are formed, porous shaped pitch spheres having a uniform porosity can be formed.

In the step (3), it is preferred to oxidize the porous shaped pitch spheres to make the spheres non-meltable. Oxidation of the porous shaped pitch spheres is preferably carried out using an oxidizing agent at a temperature not lower than 50° C. and not higher than 400° C. Preferred examples of the oxidizing agent include oxidative gases such as $O_2$, $O_3$, $NO_2$, mixed gases obtained by diluting these gases with air or nitrogen, and air; and oxidative liquids such as sulfuric acid, nitric acid and aqueous hydrogen peroxide. In practice, to carry out the oxidation and crosslinking treatment at a temperature not lower than 120° C. and lower than 300° C., use of an oxygen-containing gas such as air or other gas, for example, a mixed gas with combustion gas or the like as an oxidizing agent is convenient and also economically advantageous. In this case, if the softening point of the pitch is low, the pitch is melted during oxidation, and oxidation becomes difficult. Therefore, a pitch having a softening point not lower than 150° C. is preferably employed.

The present invention also provides a negative electrode comprising the above-described negative electrode material for non-aqueous electrolyte secondary batteries. The present invention further provides a non-aqueous electrolyte secondary battery comprising the negative electrode; a positive electrode containing a lithium composite oxide as a positive electrode; and a non-aqueous electrolyte.

The negative electrode according to the present invention can be prepared by adding to the negative electrode material for non-aqueous electrolyte secondary batteries a binder alone or a combination of the binder and an electroconductive assistant comprising an electroconductive carbon black such as acetylene black or furnace black in an amount of not less than 1% by weight and not more than 10% by weight based on the negative electrode material; adding an appropriate solvent in an appropriate amount; kneading the resulting mixture to obtain an electrode blend paste; applying the prepared paste on an electroconductive collector material such as a circular or rectangular metal plate and drying the paste; and then pressure-shaping the dried paste to form a layer with a desired thickness, for example, not less than 10 μm and not more than 100 μm.

As a binder, any material which does not react with the electrolytic solution, such as polyvinylidene fluoride, polytetrafluoroethylene or SBR (styrene-butadiene copolymer rubber), can be employed without limitation. In cases where polyvinylidene fluoride is used as the binder, a polar solvent such as N-methylpyrrolidone (NMP) can preferably be employed. In cases where an aqueous emulsion such as SBR is used as an interparticle binder, water can also be employed as a solvent. The amount of the binder is preferably in the range of not less than 0.5 parts by weight and not more than 10 parts by weight based on 100 parts by weight of the negative electrode material. If the amount of the added binder is too great, both the electric resistance of the obtained electrode and the internal resistance of the battery become high, and the battery performances deteriorate. On the other hand, if the amount of the added binder is too small, the binding between the particles constituting the negative electrode material and between the particle and the collector material, is insufficient.

The positive electrode of the non-aqueous electrolyte secondary battery of the present invention preferably contains a lithium composite oxide as a positive electrode active material. Preferred examples of the lithium composite oxide which can be used include composite metal chalcogenides such as $LiCoO_2$, $LiNiO_2$, $LiMnO_2$ and $LiMn_2O_4$. The positive electrode can be formed by an ordinary forming method wherein the active material is shaped together with an appropriate binder and a carbon material for giving electro conductivity to the electrode, to form a layer on an electroconductive collector material.

As the electrolytic solution of the non-aqueous electrolyte secondary battery of the present invention, an ordinary non-aqueous electrolytic solution can be used. The non-aqueous electrolytic solution can be formed by dissolving an electrolyte in a non-aqueous solvent. As the non-aqueous solvent, propylene carbonate, ethylene carbonate, dimethyl carbonate, diethyl carbonate, dimethoxyethane, diethoxyethane, γ-butyrolactone, tetrahydrofuran, 2-methyltetrahydrofuran, sulfolan or 1,3-dioxolane, can be employed alone or in combination of two or more of these solvents. As the electrolyte, $LiClO_4$, $LiPF_6$, $LiBF_4$, $LiCF_3SO_3$, $LiAsF_6$, LiCl, LiBr, $LiB(C_6H_5)_5$, $LiN(SO_3CF_3)_2$ or the like can be used.

The non-aqueous electrolyte secondary battery according to the present invention may be formed by arranging the above-described negative electrode and positive electrode such that they face each other via a separator, and immersing the resultant in an electrolytic solution. As a separator, a liquid-permeable separator made of a non-woven fabric or other porous material, usually used in secondary batteries, can be used. Alternatively, in place of the separator, or together with the separator, a solid electrolyte made of a polymer gel in which an electrolytic solution is immersed, can also be used.

The non-aqueous electrolyte secondary battery according to the present invention can preferably be used as a non-aqueous electrolyte secondary battery for hybrid electric vehicles.

EXAMPLES

Figure 1:
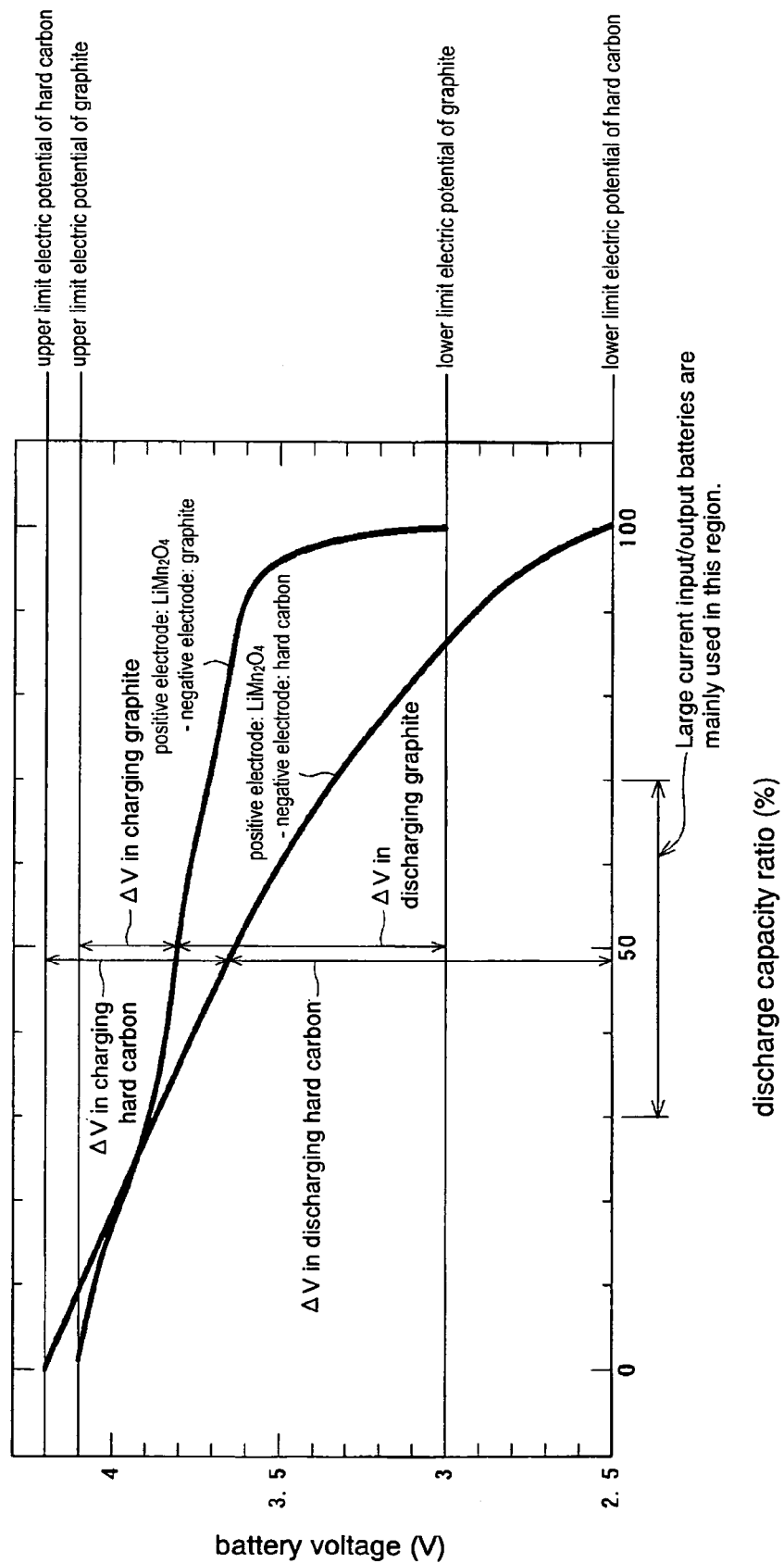
FIG. 1 shows charge-discharge curves of non-aqueous electrolyte secondary batteries, wherein curve (1) shows a charge-discharge curve of a secondary battery for small mobile devices, and curve (2) shows a charge-discharge curve of a high current secondary battery.
Figure 2A:
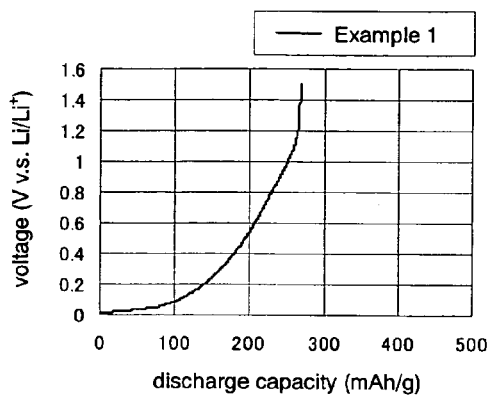
FIG. 2a shows discharge curves of the secondary batteries prepared in Examples 1 to 6 with respect to the counter lithium electric potential.
Figure 2A:
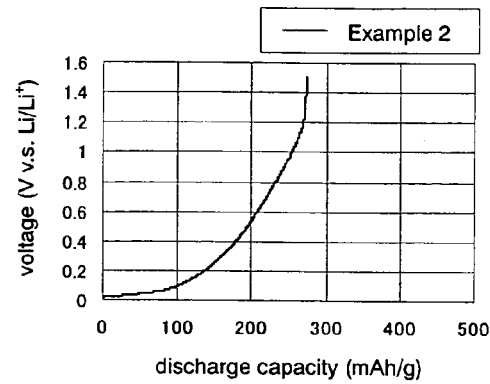
Figure 2A:
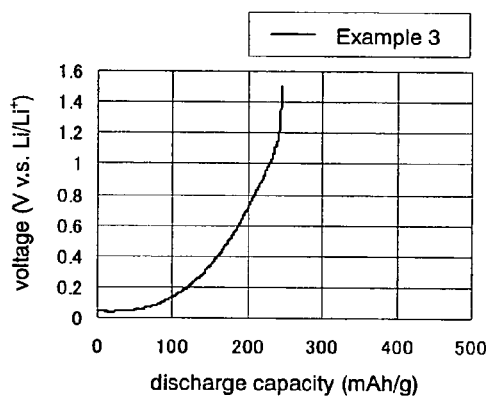
Figure 2A:
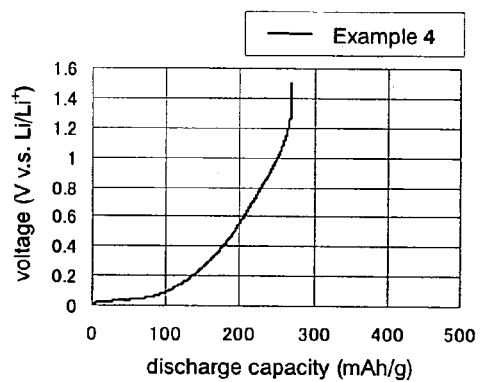
Figure 2A:
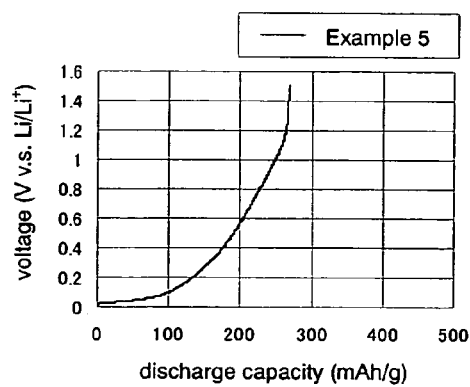
Figure 2A:
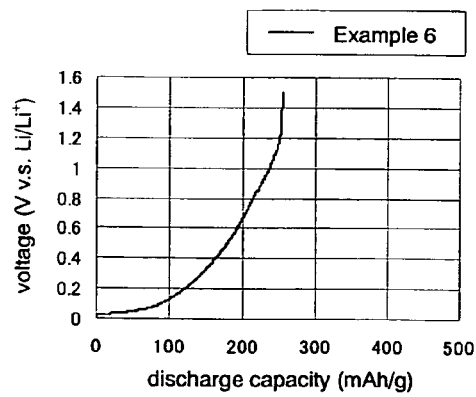
Figure 2B:
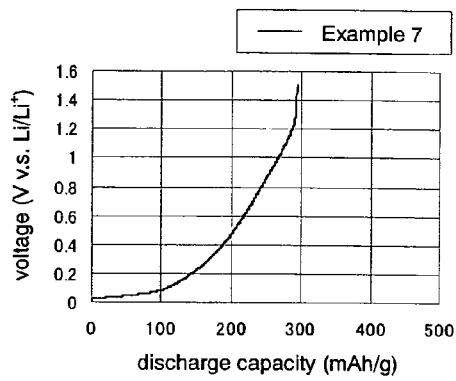
FIG. 2b shows discharge curves of the secondary batteries prepared in Examples 7 to 11 with respect to the counter lithium electric potential.
Figure 2B:
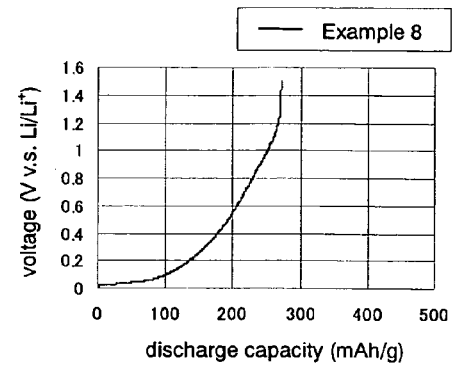
Figure 2B:
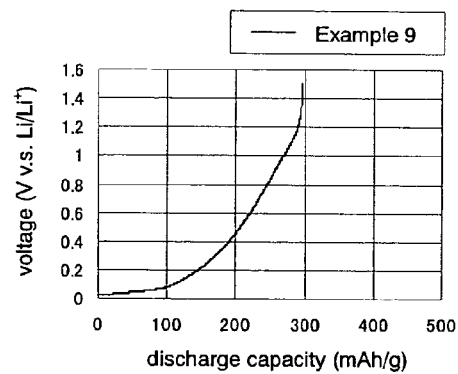
Figure 2B:
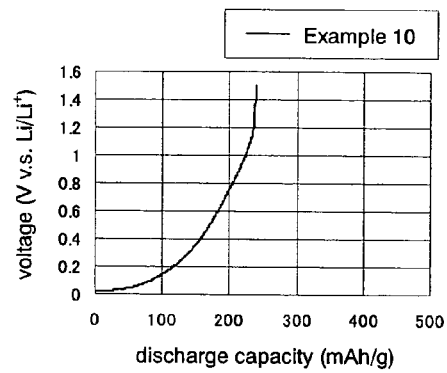
Figure 2B:
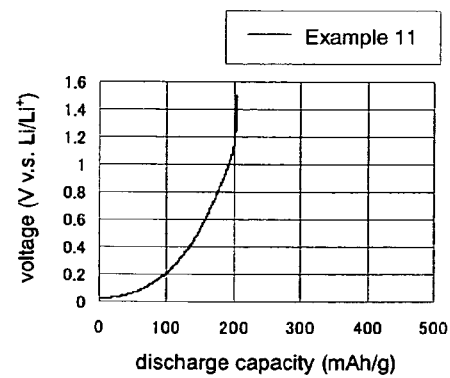
Figure 2C:
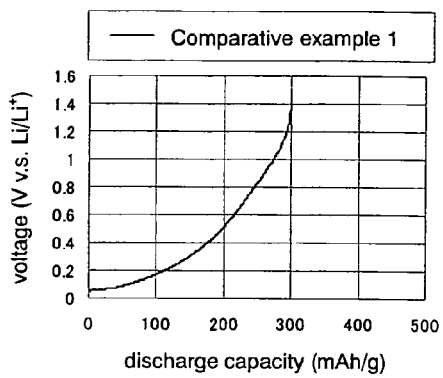
FIG. 2c shows discharge curves of the secondary batteries prepared in Comparative Examples 1 to 6 with respect to the counter lithium electric potential.
Figure 2C:
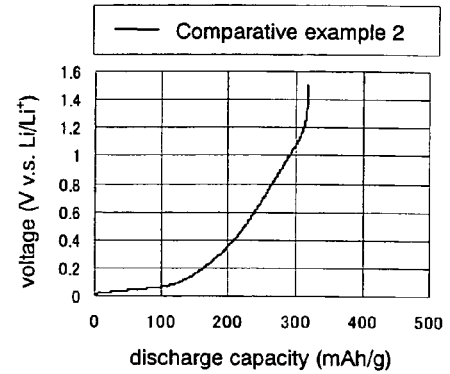
Figure 2C:
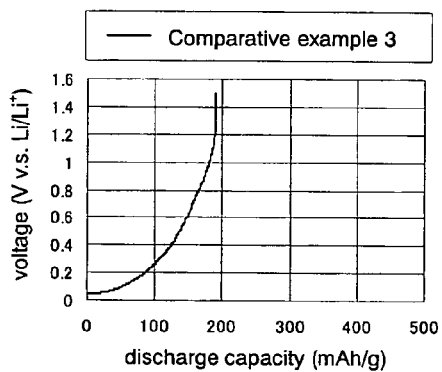
Figure 2C:
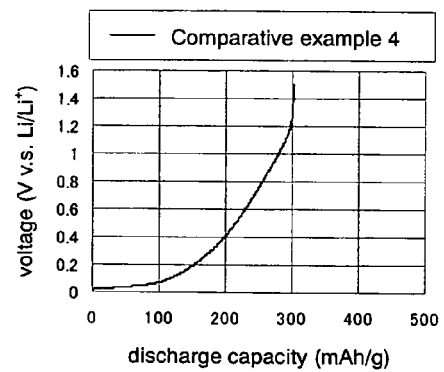
Figure 2C:
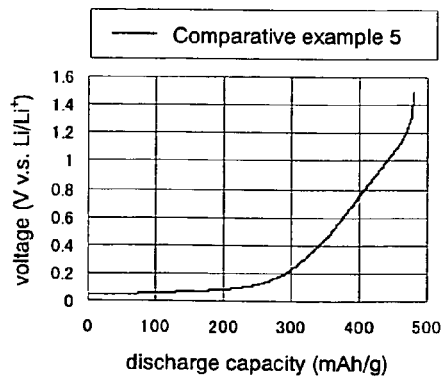
Figure 2C:
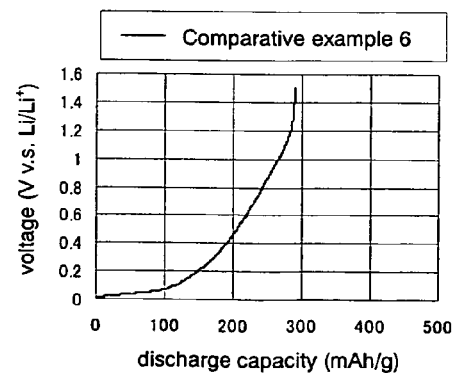
Figure 2D:
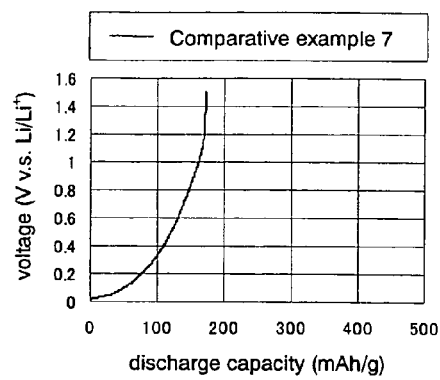
FIG. 2d shows discharge curves of the secondary batteries prepared in Comparative Examples 7 and 8 with respect to the counter lithium electric potential.
Figure 2D:
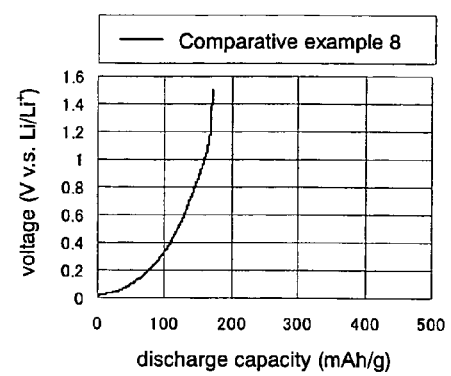
Figure 3A:
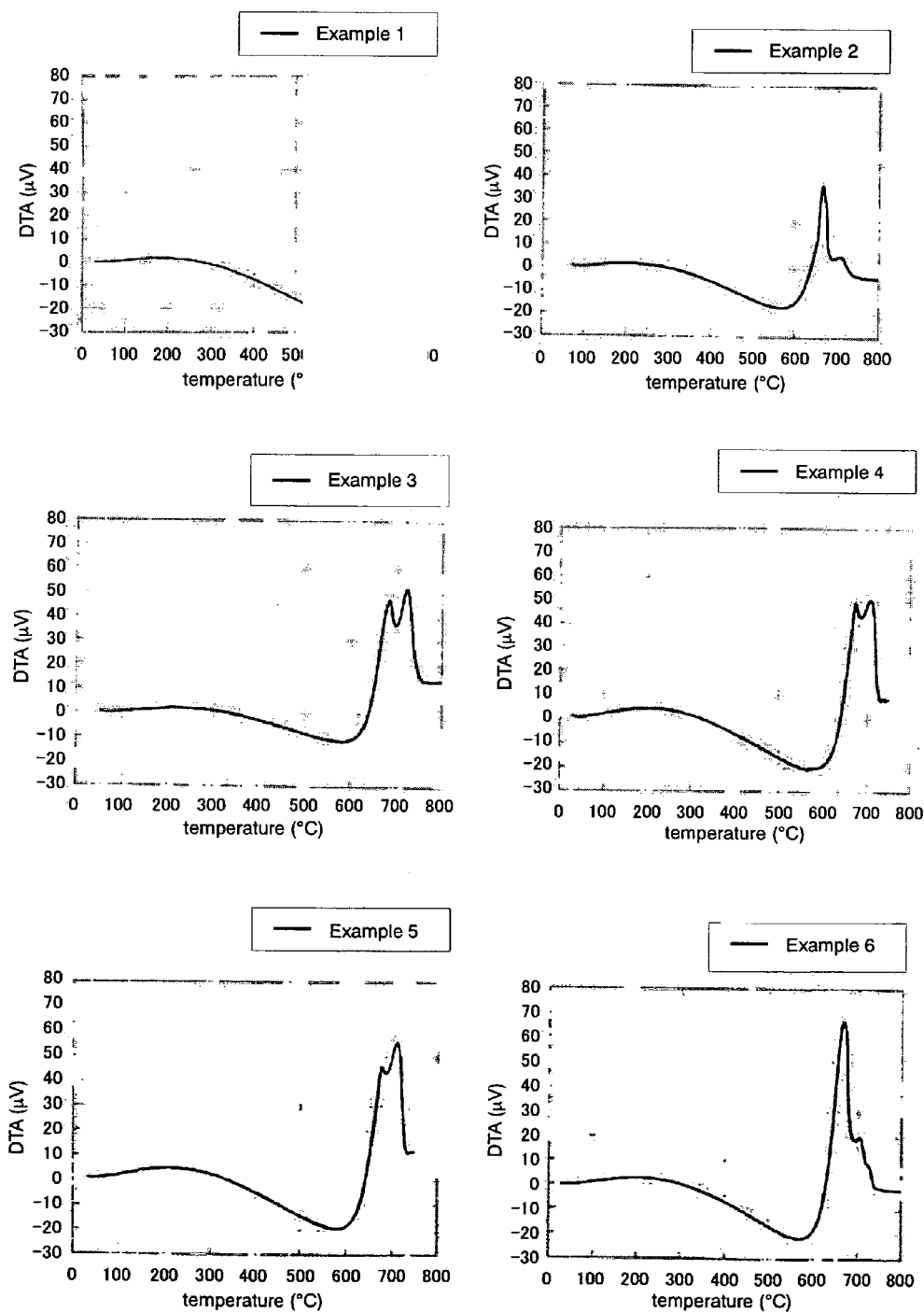
FIG. 3a shows differential thermal analysis data of the negative electrode material prepared in Examples 1 to 6.
Figure 3B:
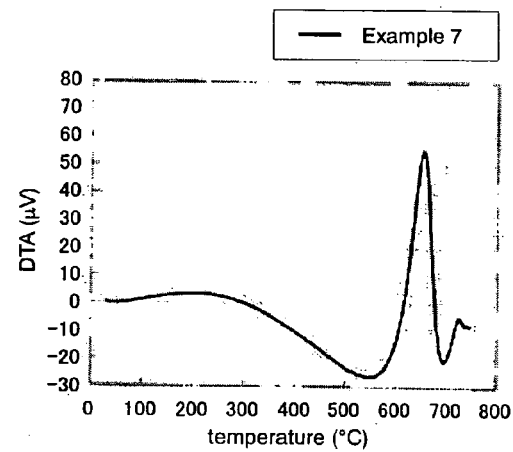
FIG. 3b shows differential thermal analysis data of the negative electrode material prepared in Examples 7 to 11.
Figure 3B:
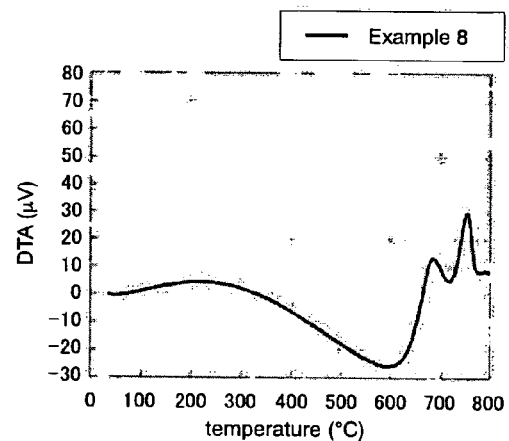
Figure 3B:
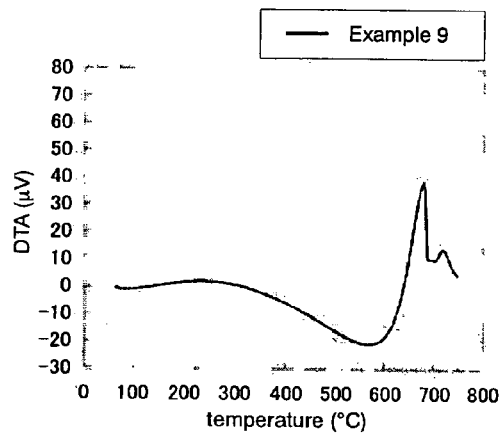
Figure 3B:
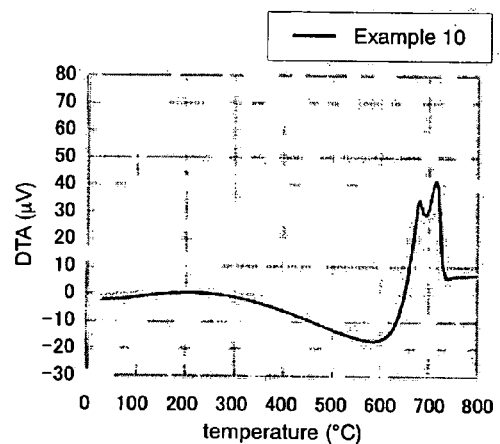
Figure 3B:
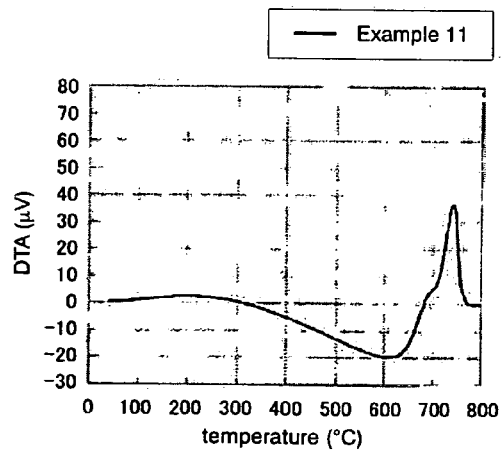
Figure 3C:
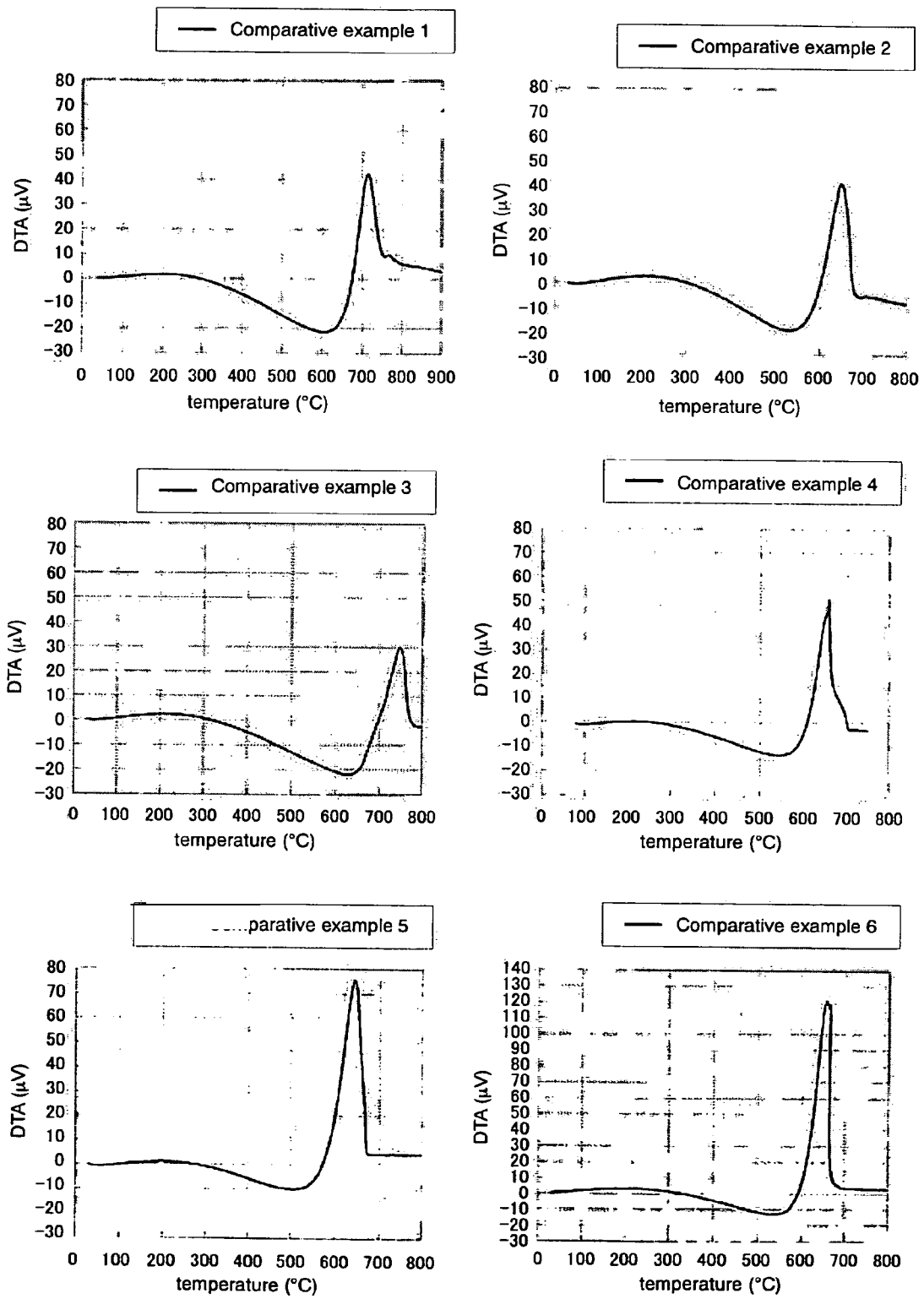
FIG. 3c shows differential thermal analysis data of the negative electrode material prepared in Comparative Examples 1 to 6.
Figure 3D:
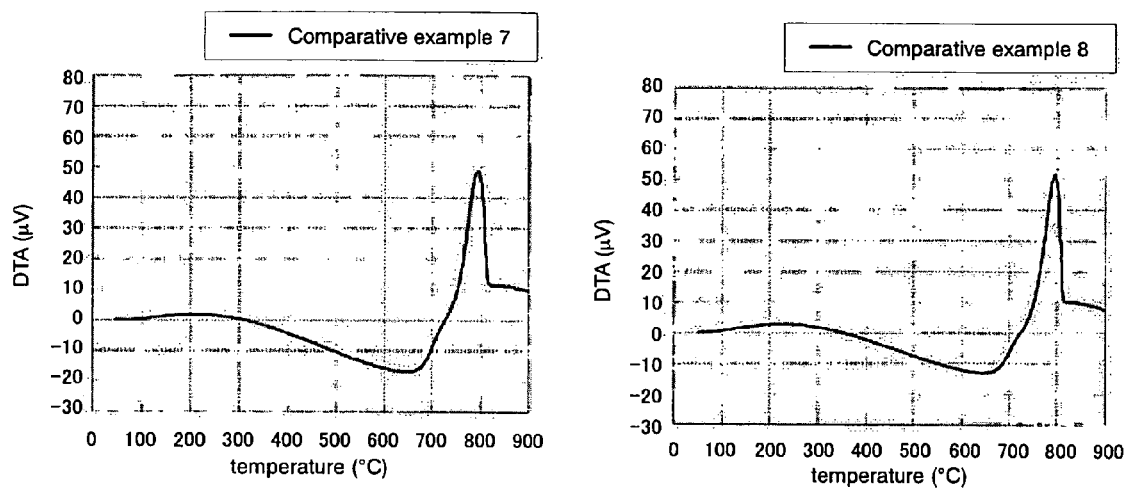
FIG. 3d shows differential thermal analysis data of the negative electrode material prepared in Comparative Examples 7 and 8.
Figure 4:
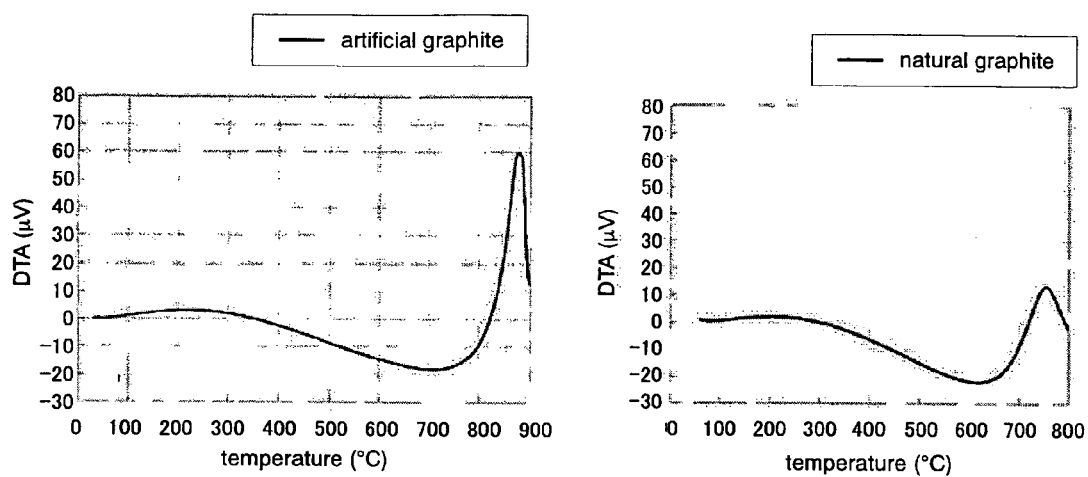
FIG. 4 shows differential thermal analysis data of graphite.

The present invention will now be described in detail, referring to Examples and Comparative Examples. The present invention is not restricted thereto. The values of the physical properties described herein are determined by the methods described below.

[Evaluation Test Items]

(XRD Measurement)

The "average interlayer spacing $d_{002}$" is the value obtained by the method wherein the negative electrode material powder is filled in a sample holder; an X-ray diffraction pattern is obtained by using CuKα ray monochromatized with a graphite monochrometer as a radiation source; the peak position of the diffraction pattern is obtained by the integration method (a method wherein the position of the centroid of the area encircled by the tangent of the diffraction line and the diffraction pattern is determined, and then a peak position is determined by the 2θ value corresponding the position of the centroid); the obtained peak position is corrected with use of the diffraction peak of (111) face of high purity silicon powder as a standard substance; and $d_{002}$ is calculated by Bragg's formula employing 0.15418 nm as a wavelength of CuKα ray.

$$d_{002}=\lambda/(2\cdot\sin\theta) \text{ (Bragg's formula)}$$

(Measurement of Specific Surface Area)

The "specific surface area by nitrogen adsorption" is the value obtained by obtaining $v_m$ by a single point method (relative pressure x=0.3) by nitrogen adsorption at the temperature of liquid nitrogen using an approximate expression:

$$v_m=1/(v(1-x))$$

derived from the equation of B.E.T.; and calculating the specific surface area of the sample according to the following equation:

$$\text{Specific Equation}=4.35\times v_m (m^2/g)$$

wherein $v_m$ represents an adsorption amount (cm³/g) required for forming a unimolecular layer on the surface of the sample, v represents the measured adsorption amount (cm³/g), and x represents the relative pressure.

More specifically, the amount of nitrogen adsorbed to the negative electrode material at the temperature of liquid nitrogen was measured using "Flow Sorb II2300" produced by MICROMERITICS as follows:

A negative electrode material pulverized to a particle size not less than 9 μm and not more than 24 μm is filled in a test tube; the test tube is cooled to −196° C. while flowing helium gas containing nitrogen gas at a concentration of 20 mol %, thereby adsorbing nitrogen to the negative electrode material. Then the test tube is returned to room temperature. The amount of the nitrogen liberated in this step was measured by a thermal conductivity type detector, and was defined as the amount v of the adsorbed gas.

(Measurement of Butanol True Density)

True density ($\rho_B$) was measured according to JIS R1620 (2) pycnometer method at 30° C. using butanol as a displacement medium.

(Measurement of Helium True Density)

Measurement of the true density $\rho_H$ using helium as a displacement medium was carried out using multivolume pycnometer (Accupyc 1330) produced by Micromeritics, after drying the sample in vacuum at 200° C. for 12 hours. The ambient temperature during measurement was fixed to 25° C. Any of the pressures measured by this method is gauge pressure, which is a pressure calculated by subtracting the ambient pressure from the absolute pressure.

The multivolume pycnometer produced by Micromeritics has a sample chamber and an expansion chamber, and the sample chamber is equipped with a pressure meter for measuring the pressure in the chamber. The sample chamber and the expansion chamber are connected through a connecting tube equipped with a valve. To the sample chamber, a helium gas-introducing tube equipped with a stop valve is connected. To the expansion chamber, a helium gas-exhausting tube equipped with a stop valve is connected.

The measurement was carried out as follows:

The volume of the sample chamber ($V_{CELL}$) and the volume of the expansion chamber ($V_{EXP}$) were preliminarily measured using a standard. The sample was placed in the sample chamber, and helium gas was flown through the helium gas-introducing tube of the sample chamber, the connecting tube and the helium-gas exhausting tube of the expansion tube for 2 hours so as to replace the atmosphere in the apparatus with helium gas. Then, the valve between the sample chamber and the expansion chamber, and the valve in the helium gas-exhausting tube for exhausting the gas from the expansion chamber were closed (thereby, helium gas with the same pressure as the ambient pressure remained in the expansion chamber), and helium gas was introduced from the helium gas-introducing tube of the sample chamber until a pressure of 134 kPa was achieved, followed by closing the stop valve in the helium gas-introducing tube. The pressure ($P_1$) in the sample chamber 5 minutes after closing the stop valve was measured. Then the valve between the sample chamber and the expansion chamber was opened to transfer the helium gas to the expansion chamber, and the pressure ($P_2$) at that time was measured.

The volume of the sample ($V_{SAMP}$) was calculated according to the following equation:

$$V_{SAMP}=V_{CELL}-V_{EXP}/[(P_1/P_2)-1]$$

Therefore, taking the weight of the sample as $W_{SAMP}$, the helium true density is obtained by the following equation:

$$\rho_H=W_{SAMP}/V_{SAMP}$$

(Measurement by Differential Thermal Analysis)

Differential thermal analysis was carried out using DTG-50 produced by Shimadzu Corporation under dry air flow. The analysis conditions were: 2 mg of sample; under air flow of 100 ml/min; and at a rate of elevating temperature of 10° C./min. From the differential thermal curve, the exothermic peak temperature was read.

(Oxygen Content)

Elementary analysis by CHN Analyzer was carried out. The oxygen content was calculated according to the following equation:

$$100\%-C\%-H\%-N\%$$

(Measurement of Water Adsorption)

The negative electrode material was placed in a thermo-hygrostat bath, and the change in weight due to water adsorption was measured. The measurement was carried out according to the method for measurement of water defined in JIS K1469. Before the measurement, the negative electrode material was dried in vacuum at 200° C. for 12 hours, and then, 1 g of the negative electrode material was spread in a vessel with a lid, which vessel has a longitudinal length of 5.5 cm, width of 8.5 cm and a height of 1.5 cm, such that the negative electrode material was spread as thin as possible. The vessel was left to stand in the thermo-hygrostat bath in which temperature and humidity were fixed to 40° C. and 90%, respectively, for 120 hours, in the state that the vessel was not covered with the lid. After that, the vessel was taken out of the thermo-hygrostat bath and weighed (Weight a). Then the sample was dried in a free convection type drier whose inside was kept at 107° C., for 2 hours, and was allowed to cool in a desiccator to room temperature, followed by weighing (Weight b). The equilibrium water adsorption (unit: % by weight) was calculated by the following equation:

$$100(b-a)/a$$

(Chlorine Content)

The negative electrode material was combusted using an oxyhydrogen flame burner (Wickbold V5 type produced by Heraeus), and the HCl in the generated combustion gas was absorbed in 0.01 M aqueous NaOH solution, followed by quantifying the chlorine content in the aqueous solution with an ion chromatography analyzer (DX-300 type produced by DIONEX). In preparing a calibration curve of the ion chromatography analyzer, analysis was conducted preparing dilutions with concentrations of 20 ppm, 100 ppm and 500 ppm, respectively, of the standard chloride ion solution for ion chromatography (aqueous sodium chloride solution, chloride ion concentration: 1000 ppm) produced by Kanto Chemical Co., Inc.

(Softening Point)

Using a "Koka" type flowtester produced by Shimadzu Corporation, 1 g of the sample (pitch) pulverized to a size of not more than 250 μm was filled in a cylinder with a cross-sectional area of 1 $cm^2$ having a nozzle with a diameter of 1 mm at its bottom, and the temperature was elevated at a rate of 6° C./min applying a load of 9.8 $N/cm^2$ (10 $kg/cm^2$). With the rise of temperature, the powder particles were softened and the filling factor was increased, so that the volume of the sample powder decreased, but the decrease in the volume was stopped at a certain temperature. The temperature was further elevated and the melted sample was flown out from the nozzle at the bottom of the cylinder. The temperature at which the decrease in volume of the sample powder was stopped was defined as a softening point of the sample. In some cases of a sample having a high softening point, flowing out of the sample from the nozzle does not occur.

(Method for Preparing Cell for Measurement and Evaluation of Charge-Discharge Capacity)

Using the negative electrode materials prepared in Examples and Comparative Examples described below, non-aqueous electrolyte secondary batteries were prepared by the following method and their characteristics were evaluated. Although the negative electrode material of the present invention is suitable for use as a negative electrode of a non-aqueous electrolyte secondary battery, counter electrode lithium evaluation was performed in order to evaluate the charge capacity, discharge capacity and non-discharge capacity, which are the effects of the present invention, with high accuracy without being influenced by the variation in the performance of the counter electrode. That is, a lithium secondary battery employing lithium metal having stable characteristics as a negative electrode, and the negative electrode material obtained above as a positive electrode was constituted, and its characteristics were evaluated.

The positive electrode (carbon electrode) was prepared as follows: To 95 parts by weight of the negative electrode material prepared in each Example and 5 parts by weight of polyvinylidene fluoride, N-methyl-2-pyrrolidone was added to prepare a paste, and the paste was uniformly applied to a copper foil, followed by drying the paste under nitrogen gas atmosphere at 130° C. for 30 minutes. The electrode in the form of a sheet was punched into a disk with a diameter of 15 mm, and the obtained disk was pressed to obtain the electrode. The weight of the carbonaceous material (negative electrode material) in the electrode was adjusted to about 20 mg, and the press was conducted so as to make the filling factor of the carbonaceous material about 67%.

Preparation of the Negative Electrode (Lithium Electrode) was carried out in a glove box in an Ar gas atmosphere. After preliminarily spot-welding a stainless steel net disk with a diameter of 17 mm to the outer lid of a can of a coin type battery of 2016 size, a disk prepared by punching a metal lithium thin plate with a thickness of 0.5 mm into a disk with a diameter of 15 mm was pressure-bonded to the stainless steel net disk.

A coin type non-aqueous electrolyte lithium secondary battery of 2016 size was assembled in an Ar globe box using the positive electrode and the negative electrode prepared as described above; using as an electrolytic solution a mixture prepared by adding $LiPF_6$ to a mixed solvent to ratio of 1 mol/liter, which mixed solvent was prepared by mixing ethylene carbonate, dimethyl carbonate and ethylmethyl carbonate at a ratio of 3:4:4 by volume; using as a separator a polypropylene film having micro pores; and using a gasket made of polyethylene.

In the lithium secondary battery having such a constitution, doping and dedoping of lithium to the positive electrode (carbonaceous material) were carried out and the capacities in this process were measured. Doping was carried out by the constant current and constant voltage method. Constant current charging was carried out at a current density of 0.5 $mA/cm^2$ until 0V was reached. At the time point of reaching 0V, the current was decreased keeping the voltage constant, and when the current reached 20 μA, charging was terminated. The value obtained by dividing the quantity of electricity measured in this process by the weight of the carbonaceous material used was defined as a charge capacity, and expressed in the unit of mAh/g. Then electric current was passed in the opposite direction in the same manner to dedope the lithium doped in the carbonaceous material. The dedoping was carried out at a current density of 0.5 $mA/cm^2$, and the terminal voltage of 1.5V was used as the cutoff voltage. The quantity of electricity measured in this process was defined as a discharged capacity, and expressed in the unit of mAh/g. Then the irreversible capacity was calculated as a difference between the charge capacity and the discharge capacity. Discharge efficiency (%) was obtained by multiplying the value by 100, the value being obtained by dividing the discharge capacity by the charge capacity. This is the value indicative how effectively the active material was used. The measurement of the characteristics was carried out at 25° C.

(High Temperature Cycle Durability)

The discharge capacity after 100 cycles at 45° C. in the battery combining an $LiCoO_2$ positive electrode was determined as a % capacity retaining rate with respect to the initial discharge capacity. The details are as follows:

As the positive electrode material (active material), $LiCoO_2$ (Cellseed C5-H produced by Nippon Chemical Industrial) was used. This positive electrode material in an amount of 94 parts by weight and 3 parts by weight of acetylene black were mixed with 3 parts by weight of polyvinylidene fluoride as a binder, and N-methyl-2-pyrrolidone (NMP) was added to prepare a paste. The paste was uniformly applied to both surfaces of a belt-like aluminum foil with a thickness of 20 μm, and was dried at 130° C. for 30 minutes. The obtained electrode in the form of a sheet was punched into a disk with a diameter of 14 mm, and the obtained disk was pressed to obtain the positive electrode.

The negative electrode (carbon electrode) was prepared as follows: To 95 parts by weight of the negative electrode material prepared in each of the Examples and Comparative Examples described below and 5 parts by weight of polyvinylidene fluoride, NMP was added to prepare a paste, and the paste was uniformly applied to a copper foil, followed by drying the paste under inert atmosphere at 130° C. for 30 minutes. The electrode in the form of a sheet was punched into a disk with a diameter of 15 mm, and the obtained disk was pressed to obtain the negative electrode. The amount of the negative electrode material (carbonaceous material) in the electrode was adjusted to about 20 mg, and the press was conducted to make the filling factor of the carbonaceous material about 67%.

A coin type non-aqueous electrolyte lithium secondary battery of 2016 size was assembled in an Ar globe box using the positive electrode and the negative electrode prepared as described above; using as an electrolytic solution a mixture prepared by adding $LiPF_6$ to a mixed solvent to ratio of 1 mol/liter, which mixed solvent was prepared by mixing ethylene carbonate, dimethyl carbonate and ethylmethyl carbonate at a ratio of 3:4:4 by volume; using as a separator a polypropylene film having micropores; and using a gasket made of polyethylene. Charge-discharge test was conducted on the lithium secondary battery having such a constitution.

Charging was conducted by the constant current and constant voltage method. The charging conditions were as follows: The upper voltage of charging was set to 4.2V, and the charging electric current was set to 1 C (that is, the electric current required for completing charging in 1 hour). After reaching 4.2V, the current was decreased keeping the voltage constant, and when the current reached $1/100$ C, the charging was terminated. Then discharge was carried out by passing current in the opposite direction. The discharging was carried out at an electric current of 1 C, and when 2.75V was reached, discharging was terminated. By repeating charging and discharging in this manner in a thermostat bath at 45° C., high temperature cycle performances were evaluated.

In the above-described evaluation of cycle performances, the discharge capacity after 100 cycles was divided by the discharge capacity in the first cycle, and the obtained value was defined as a capacity retaining rate (%).

Examples and Comparative Examples of the preparation of various negative electrode materials are described below. The gas flow rate described below is the value under standard condition (0° C., 1 atm).

Example 1

To a pressure-resistant vessel having an inner volume of 300 liters equipped with stirring blades and an exit nozzle, 70 kg of a petroleum pitch having a softening point of 205° C. and an H/C atomic ratio of 0.65, and 30 kg of naphthalene were fed, and the mixture was heated at 190° C. and melt-mixed. Then the resulting mixture was cooled to a temperature not lower than 80° C. and not higher than 90° C., and the inside of the pressure-resistant vessel was pressurized with nitrogen gas to extrude the contents therein from the exit nozzle to obtain string-like shaped material having a diameter of about 500 µm. Then this string-like shaped material was pulverized so as to attain a ratio (L/D) of the diameter (D) to the length (L) of about 1.5, and the pulverized material was added to an aqueous solution dissolving 0.53% by weight of polyvinyl alcohol (degree of saponification: 88%) heated at 93° C. The material was dispersed by stirring and the resulting mixture was cooled to obtain a slurry of shaped pitch spheres. After removing most of the water by filtration, the naphthalene in the shaped pitch spheres was extracted and removed with n-hexane with a weight of about 6 times that of the shaped pitch spheres, to obtain porous shaped pitch spheres. Thus obtained porous shaped pitch spheres were oxidized in fluidized bed under a flow of heated air at a rate of 30 L/min and at an enhanced temperature of 215° C., to obtain porous shaped oxidized pitch spheres that are not melted by heat. The oxygen content of the obtained oxidized pitch was 6% by weight.

Then the oxidized pitch was heated to 680° C. in nitrogen gas atmosphere (normal pressure), and kept at 680° C. for 1 hour, thereby performing preliminary carbonization, to obtain a negative electrode material precursor having a volatile component of not more than 2%. The obtained negative electrode material precursor was pulverized to obtain a powdery negative electrode material precursor having an average particle size of about 10 µm.

The obtained powdery negative electrode material precursor in an amount of 30 g was fed into a cylindrical crucible whose sample-receiving part had a diameter of 40 mm and a height of 60 mm, and the entrance of the crucible was tightly closed with a carbon plate, followed by carbonation under such a condition that low molecular gases generated in the carbonization reaction are retained in the crucible. The crucible was placed in an electric furnace, and inside of the system was replaced with nitrogen gas after degassing under vacuum. Thereafter, the inside of the electric furnace was changed to nitrogen gas atmosphere of normal pressure (no gas flow), and the temperature was elevated to 1300° C. at a rate of 250° C./h, followed by keeping the crucible at 1300° C. for 1 hour, to prepare the negative electrode material (carbonaceous material).

Example 2

A negative electrode material (carbonaceous material) was prepared in the same manner as in Example 1, except that the oxidation of the porous pitch spheres was carried out by heating the pitch to 223° C. to obtain an oxidized pitch having an oxygen content of 9% by weight, and that the carbonization temperature of the oxidized pitch having an oxygen content of 9% by weight was 1200° C.

Example 3

A negative electrode material (carbonaceous material) was prepared in the same manner as in Example 2 except that the carbonization temperature of the porous oxidized pitch spheres was 1300° C.

Example 4

A negative electrode material (carbonaceous material) was prepared in the same manner as in Example 2 except that the carbonization pressure was 2 kPa.

Example 5

A negative electrode material (carbonaceous material) was prepared in the same manner as in Example 2 except that the carbonization pressure was 10 kPa.

Example 6

A negative electrode material (carbonaceous material) was prepared in the same manner as in Example 2 except that the flow rate of the nitrogen gas flow during the carbonization reaction was 60 ml/g·h.

Example 7

A negative electrode material (carbonaceous material) was prepared in the same manner as in Example 2 except that the flow rate of the nitrogen gas flow during the carbonization reaction was 120 ml/g·h, and the carbonization reaction was carried out in a fluidized bed.

Example 8

A negative electrode material (carbonaceous material) was prepared in the same manner as in Example 1 except that the oxygen content of the porous oxidized pitch spheres was 5% by weight.

Example 9

A negative electrode material (carbonaceous material) was prepared in the same manner as in Example 1 except that the oxygen content of the porous oxidized pitch spheres was 5% by weight, and that the carbonization temperature was 1200° C.

Example 10

A negative electrode material (carbonaceous material) was prepared in the same manner as in Example 2 except that the carbonization temperature was 1350° C.

Example 11

A negative electrode material (carbonaceous material) was prepared in the same manner as in Example 2 except that the carbonization temperature was 1400° C.

Comparative Example 1

A carbonaceous material was prepared in the same manner as in Example 1 except that the oxygen content of the porous oxidized pitch spheres was 3% by weight, and that the carbonization temperature was 1200° C.

Comparative Example 2

A carbonaceous material was prepared in the same manner as in Example 2 except that the carbonization temperature was 1100° C.

Comparative Example 3

A carbonaceous material was prepared in the same manner as in Example 2 except that the carbonization temperature was 1500° C.

Comparative Example 4

A carbonaceous material was prepared in the same manner as in Example 1 except that the oxygen content of the porous oxidized pitch spheres was 10% by weight, and that the carbonization temperature was 1200° C.

Comparative Example 5

A carbonaceous material was prepared in the same manner as in Example 1 except that the oxygen content of the porous oxidized pitch spheres was 17% by weight, that 10 g of the powdery carbon precursor was fed in the form of a thin layer on a plate sizing 8.5 cm×15 cm, heated to 1200° C. with a nitrogen gas flow of which flow rate was 200 ml/g·h, and kept at 1200° C. for 1 hour.

Comparative Example 6

A carbonaceous material was prepared in the same manner as in Example 1 except that the oxygen content of the porous oxidized pitch spheres was 17% by weight, and that the carbonization temperature was 1200° C.

Comparative Example 7

The powdery carbon precursor obtained in Comparative Example 5 in an amount of 30 g was fed into a cylindrical crucible whose sample-receiving part had a diameter of 40 mm and a height of 60 mm, and the crucible was placed in an electric furnace. After replacing the atmosphere in the electric furnace with nitrogen gas, the temperature was elevated to 2000° C. at a rate of 600° C./h with a nitrogen gas flow of normal pressure at a flow rate of 200 ml/g·h, and the temperature was kept at 2000° C. for 1 hour to prepare a carbonaceous material.

Comparative Example 8

A carbonaceous material was prepared in the same manner as in Comparative Example 7 except that when the temperature in the electric furnace reached 2000° C., the gas flow was changed to a mixed gas flow having a nitrogen gas flow with a flow rate of 166 ml/g·h and a chlorine gas flow with a flow rate of 34 ml/g·h, and the crucible was retained therein for 1 hour, and thereafter, the gas flow was changed to nitrogen gas flow with a flow rate of 200 ml/g·h.

For each of the negative electrode materials and the carbonaceous materials obtained in the Examples and Comparative Examples, the specific surface area, the helium true density, the equilibrium water adsorption, the exothermic peak temperature in differential thermal analysis, the charge capacity, the discharge capacity, the irreversible and discharge efficiency, the high temperature cycle performance capacity retaining rate (high temperature cycle durability), and the chlorine content were measured. The results are shown in Table 1.

| Example/ Comparative Example | Oxygen Content (wt %) | Temperature (° C.) | Calcination Atmosphere | Specific Surface Area m²/g | d(002) nm | Density (g/cm³) Helium | Moisture Adsorption wt % (after 120 hours) | DTA (° C.) not higher than 700° C. | DTA (° C.) not lower than 700° C. |
|---|---|---|---|---|---|---|---|---|---|
| Example 1 | 6 | 1300 | normal pressure (in crucible) · nitrogen atmosphere | 1.5 | 0.368 | 1.70 | 0.2 | 684 | 754 |
| Example 2 | 9 | 1200 | normal pressure (in crucible) · nitrogen atmosphere | 1.4 | 0.369 | 1.75 | 0.2 | 666 | 709 |
| Example 3 | 9 | 1300 | normal pressure (in crucible) · nitrogen atmosphere | 1.6 | 0.366 | 1.61 | 0.2 | 684 | 722 |
| Example 4 | 9 | 1200 | increased pressure 2 kPa · nitrogen atmosphere | 1.3 | 0.369 | 1.76 | 0.2 | 674 | 709 |
| Example 5 | 9 | 1200 | increased pressure 10 kPa · nitrogen atmosphere | 1.3 | 0.369 | 1.77 | 0.2 | 675 | 711 |
| Example 6 | 9 | 1200 | normal pressure · nitrogen flow 60 ml/g · h | 2.1 | 0.368 | 1.74 | 0.3 | 669 | 704 |

-continued

| | | | | | | | | | |
|---|---|---|---|---|---|---|---|---|---|
| Example 7 | 9 | 1200 | fluidized bed · normal pressure · nitrogen flow 120 ml/g · h | 3.4 | 0.368 | 1.74 | 0.4 | 654 | 727 |
| Example 8 | 5 | 1300 | normal pressure (in crucible) · nitrogen atmosphere | 1.5 | 0.368 | 1.65 | 0.2 | 685 | 756 |
| Example 9 | 5 | 1200 | normal pressure (in crucible) · nitrogen atmosphere | 1.4 | 0.369 | 1.71 | 0.2 | 680 | 720 |
| Example 10 | 9 | 1350 | normal pressure (in crucible) · nitrogen atmosphere | 1.5 | 0.365 | 1.60 | 0.1 | 681 | 715 |
| Example 11 | 9 | 1400 | normal pressure (in crucible) · nitrogen atmosphere | 1.5 | 0.365 | 1.60 | 0.1 | shoulder exists | 743 |
| Comparative Example 1 | 3 | 1200 | normal pressure (in crucible) · nitrogen atmosphere | 2.1 | 0.350 | 2.06 | 3.0 | none | 704, 758 |
| Comparative Example 2 | 9 | 1100 | normal pressure (in crucible) · nitrogen atmosphere | 1.4 | 0.372 | 2.05 | 1.7 | 648 | none |
| Comparative Example 3 | 9 | 1500 | normal pressure (in crucible) · nitrogen atmosphere | 1.4 | 0.360 | 1.61 | 0.1 | none | 746 |
| Comparative Example 4 | 10 | 1200 | normal pressure (in crucible) · nitrogen atmosphere | 2.5 | 0.372 | 2.00 | 1.2 | 659 | none |
| Comparative Example 5 | 17 | 1200 | normal pressure · nitrogen flow 200 ml/g · h | 7.0 | 0.380 | 2.08 | 6.6 | 643 | none |
| Comparative Example 6 | 17 | 1200 | normal pressure (in crucible) · nitrogen atmosphere | 2.7 | 0.379 | 2.05 | 2.2 | 657 | none |
| Comparative Example 7 | 17 | 2000 | normal pressure (in crucible) · nitrogen atmosphere | 2.5 | 0.363 | 1.65 | 0.2 | none | 793 |
| Comparative Example 8 | 17 | 2000 | normal pressure (in crucible) · nitrogen and chlorine atmosphere | 2.5 | 0.363 | 1.65 | 0.2 | none | 795 |

| Example/ Comparative Example | Charge mAh/g | Discharge (1.5 V) mAh/g | Irreversible Capacity mAh/g | Efficiency % | High Temperature Cycle performance Capacity-retaining Rate (%) | 0.1 V Capacity mAh/g | Chlorine Content ppm |
|---|---|---|---|---|---|---|---|
| Example 1 | 303 | 268 | 35 | 88.5 | 90 | 106 | 0 |
| Example 2 | 315 | 273 | 42 | 86.6 | 88 | 105 | 0 |
| Example 3 | 275 | 244 | 31 | 88.7 | 91 | 86 | 0 |
| Example 4 | 312 | 269 | 43 | 86.2 | 90 | 103 | 0 |
| Example 5 | 308 | 268 | 40 | 87.0 | 89 | 101 | 0 |
| Example 6 | 294 | 254 | 40 | 86.4 | 90 | 89 | 0 |
| Example 7 | 347 | 294 | 53 | 84.7 | 90 | 110 | 0 |
| Example 8 | 307 | 270 | 37 | 87.9 | 90 | 102 | 0 |
| Example 9 | 342 | 296 | 45 | 86.5 | 88 | 111 | 0 |
| Example 10 | 267 | 238 | 29 | 89.2 | 91 | 83 | 0 |
| Example 11 | 228 | 203 | 25 | 89.0 | 90 | 67 | 0 |
| Comparative Example 1 | 390 | 300 | 90 | 76.9 | 76 | 59 | 0 |
| Comparative Example 2 | 391 | 319 | 72 | 81.5 | 86 | 128 | 0 |
| Comparative Example 3 | 215 | 190 | 26 | 88.2 | 90 | 52 | 0 |
| Comparative Example 4 | 360 | 302 | 58 | 83.4 | 86 | 117 | 0 |
| Comparative Example 5 | 557 | 481 | 76 | 86.4 | 90 | 230 | 0 |
| Comparative Example 6 | 359 | 290 | 69 | 80.8 | 86 | 116 | 0 |
| Comparative Example 7 | 201 | 172 | 29 | 85.5 | 87 | 51 | 0 |
| Comparative Example 8 | 198 | 170 | 28 | 85.9 | 87 | 51 | 0 |

The invention claimed is:

1. A negative electrode material which is a non-graphitizable carbon having a small diffusibility of helium, for non-aqueous electrolyte secondary batteries, said negative electrode material having at least one exothermic peak in the range of not lower than 650° C. and lower than 700° C., and at least one exothermic peak in the range of not lower than 700° C. and lower than 760° C., in differential thermal analysis measured under an air flow;

an average interlayer spacing $d_{002}$ determined by X-ray diffraction method of not less than 0.365 nm and not more than 0.370 nm;

a true density ($\rho H$) measured according to the gas displacement method defined in JIS R1620(4) using helium as a displacement medium of not less than 1.6 g/cm$^3$ and not more than 1.8 g/cm$^3$;

an equilibrium water adsorption measured according to JIS K1469 of not more than 1% by weight;

a discharge capacity of not less than 60 mAh/g and less than 115 mAh/g per 1 g at an electric potential of 0.1V in counter electrode lithium evaluation;

a discharge capacity of not less than 200 mAh/g and less than 300 mAh/g per 1 g at an electric potential of 1.5V in counter electrode lithium evaluation; and a difference (irreversible capacity) between the capacity required for lithium doping and the capacity required for lithium dedoping of not more than 60 mAh/g and wherein said negative electrode material is obtained from negative electrode material precursor having an oxygen content of not less than 5% by weight and less than 10% by weight.

2. The negative electrode material for non-aqueous electrolyte secondary batteries, according to claim 1, wherein said negative electrode material has a specific surface area measured by BET method of not less than 0.5 m$^2$/g and not more than 5 m$^2$/g.

3. A process for producing said negative electrode material which is a non-graphitizable carbon having a small diffusibility of helium, for non-aqueous electrolyte secondary batteries according to claim 1, comprising carbonizing a negative electrode material precursor having an oxygen content of not less than 5% by weight and less than 10% by weight, under an inert gas flow at a rate of not more than 120 ml/g·h, under a pressure of normal pressure to 10 kPa, at a temperature higher than 1100° C. and lower than 1500° C.

4. The process according to claim 3, wherein said negative electrode material precursor is produced by a process comprising the steps of:

adding to a petroleum pitch or a coal pitch one or more aromatic compounds having a boiling point of not lower than 200° C. and having 2 or 3 rings, melt mixing the mixture under heat, and shaping the resulting mixture to obtain shaped pitch spheres enclosing said aromatic compound(s);

extracting and removing said enclosed aromatic compound (s) from said shaped pitch spheres using a solvent in which said pitch has a low solubility and said aromatic compound(s) has a high solubility, thereby obtaining porous shaped pitch spheres; and oxidizing the obtained porous shaped pitch spheres.

5. A negative electrode comprising said negative electrode material which is a non-graphitizable carbon having a small diffusibility of helium, for non-aqueous electrolyte secondary batteries recited in claim 1.

6. A non-aqueous electrolyte secondary battery, comprising said negative electrode recited in claim 5; a positive electrode containing a lithium composite oxide as a positive electrode; and a non-aqueous electrolyte.

7. The non-aqueous electrolyte secondary battery according to claim 6, which is a non-aqueous electrolyte secondary battery for hybrid electric vehicles.

8. A process for producing said negative electrode material which is a non-graphitizable carbon having a small diffusibility of helium, for non-aqueous electrolyte secondary batteries according to claim 2, comprising carbonizing a negative electrode material precursor having an oxygen content of not less than 5% by weight and less than 10% by weight, under an inert gas flow at a rate of not more than 120 ml/g·h, under a pressure of normal pressure to 10 kPa, at a temperature higher than 1100° C. and lower than 1500° C.

9. The process according to claim 8, wherein said negative electrode material precursor is produced by a process comprising the steps of:

adding to a petroleum pitch or a coal pitch one or more aromatic compounds having a boiling point of not lower than 200° C. and having 2 or 3 rings, melt mixing the mixture under heat, and shaping the resulting mixture to obtain shaped pitch spheres enclosing said aromatic compound(s);

extracting and removing said enclosed aromatic compound (s) from said shaped pitch spheres using a solvent in which said pitch has a low solubility and said aromatic compound(s) has a high solubility, thereby obtaining porous shaped pitch spheres; and oxidizing the obtained porous shaped pitch spheres.

10. A negative electrode comprising said negative electrode material which is a non-graphitizable carbon having a small diffusibility of helium, for non-aqueous electrolyte secondary batteries recited in claim 2.

11. A non-aqueous electrolyte secondary battery, comprising said negative electrode recited in claim 10; a positive electrode containing a lithium composite oxide as a positive electrode; and a non-aqueous electrolyte.

12. The non-aqueous electrolyte secondary battery according to claim 11, which is a non-aqueous electrolyte secondary battery for hybrid electric vehicles.

* * * * *